United States Patent [19]
McCombs et al.

[11] Patent Number: 5,387,344
[45] Date of Patent: Feb. 7, 1995

[54] PROCESS FOR TREATING WASTE WATER OXIDATION PONDS TO ABATE MALODORS

[75] Inventors: David E. McCombs; Colin N. Dougald; Martin L. Rapp, all of St. Louis, Mo.

[73] Assignee: Monsanto Enviro-Chem Systems, Inc., St. Louis, Mo.

[21] Appl. No.: 975,664

[22] Filed: Nov. 13, 1992

[51] Int. Cl.$^6$ ................................................. C02F 3/06
[52] U.S. Cl. ................................... 210/617; 210/621; 210/908; 95/273
[58] Field of Search ............... 210/604, 617, 620, 621, 210/750, 908, 909; 95/141, 187, 211, 273

[56] References Cited

U.S. PATENT DOCUMENTS

| | | | |
|---|---|---|---|
| 4,421,534 | 12/1983 | Walker | 210/617 |
| 4,869,824 | 9/1989 | Melin et al. | 210/620 |
| 4,892,664 | 1/1990 | Miller | 210/750 |
| 4,966,704 | 10/1990 | Särner | 210/621 |
| 4,999,302 | 3/1991 | Kahler et al. | 95/218 |
| 5,045,215 | 9/1991 | Lamarre | 210/750 |
| 5,122,166 | 6/1992 | Hyrcyk et al. | 95/258 |
| 5,190,668 | 3/1993 | Chuang | 210/750 |
| 5,246,584 | 9/1993 | Donaldson et al. | 210/621 |
| 5,259,868 | 11/1993 | Doubrawa et al. | 95/273 |

Primary Examiner—Thomas Wyse
Attorney, Agent, or Firm—Senniger, Powers, Leavitt & Roedel

[57] ABSTRACT

A process and an apparatus for treating waste water in oxidations ponds, oxidation ditches, or other bodies of water in a waste water treatment facility to abate the malodors caused by the presence of volatile contaminants. In the process, a water stream is withdrawn from the body of waste water and contacted with an air stream in an air-water contact apparatus. The water stream is thereby aerated and stripped of potentially odor causing volatile contaminants and an off-gas stream is produced containing the stripped volatile contaminants. At least a portion of the aerated and stripped water stream is returned to the body of waste water to inhibit anaerobic decomposition of organic impurities. The off-gas stream is passed through a fixed bed type biofilter comprising a porous filter bed provided with appropriate microorganisms so that the volatile contaminants in the off-gas stream come into contact with the microorganisms and are biologically metabolized into environmentally innocuous substances rather than being emitted into the ambient air.

8 Claims, 2 Drawing Sheets

PROCESS FOR TREATING WASTE WATER OXIDATION PONDS TO ABATE MALODORS

SUMMARY OF THE INVENTION

This invention relates to a process and an apparatus for treating a body of waste water to abate the malodors caused by the presence of volatile contaminants such as volatile organic compounds (VOC's), volatile inorganics (e.g., hydrogen sulfide and ammonia) and volatile organosulfur compounds.

Secondary treatment of waste water is now required at many publicly owned treatment works (POTW's). Secondary treatment is primarily designed to reduce the oxygen demand of treated waste water through biodegradation of soluble organic materials. Secondary processes are typified by the presence of a chemoorganoheterotrophic microbial population which utilizes the contaminants found in waste water as substrate and metabolically converts these impurities to innocuous oxidation products and cell material. Popular approaches to secondary treatment include trickling filters, activated sludge and oxidation ponds.

Oxidation ponds (also called lagoons and stabilization ponds) are one of the most commonly employed secondary treatment systems and account for about one third of all secondary treatment facilities in the United States. The popularity stems from the relative ease in constructing, operating and maintaining oxidation ponds as well as the low construction costs and the absence of energy requirements in naturally aerated ponds. Mechanically aerated ponds have moderate power requirements associated with the operation of the aeration equipment.

Oxidation ponds are frequently maintained at a depth of two to four feet, although depths of ten feet or greater may be employed. Relatively shallow ponds with large surface areas provide increased contact between the waste water and ambient air and thereby increase the amount of oxygen transferred to the water. However, even shallow ponds, which are ideally aerobic through nearly all depths, have an anaerobic sludge layer that accumulates on the bottom of the pond.

Several interrelated ingredients or factors are necessary to sustain the biodegradation of impurities in waste water. Good contact between the microbial population and the soluble contaminants in the waste water as well as sufficient residence time and moderate temperatures are required to insure that the impurities are metabolized. Algae in the pond, if present, consumes the carbon dioxide produced by the microorganisms and in turn releases oxygen which supplements the dissolved oxygen content resulting from interaction of air and water at the surface of the pond.

Although oxidation ponds are an effective secondary treatment process, they are frequently accompanied by objectionable odors that result from the volatilization of malodorous contaminants found in the waste water. Potentially odor causing contaminants include a wide range of aliphatic and aromatic VOC's as well as volatile sulfides and organosulfur compounds. The types and concentrations of these various volatile contaminants that are found in the waste water influent of a particular pond depends on the water use profile. Some of the VOC's frequently encountered in waste water oxidation pond influent include: benzene, toluene, xylenes, styrene, formaldehyde, methylene chloride, perchloroethylene and acetone.

The odor problem attendant oxidation ponds frequently worsens due to microbial depletion of dissolved oxygen in the waste water at a rate faster than it can be replenished by either the algae or by transfer from ambient air. Failure to maintain aerobic conditions in oxidation pond waste water has unpleasant consequences. If oxygen content is depleted to an extent such that anaerobic conditions predominate, putrefaction and other decomposition processes produce malodorous, incompletely oxidized products. Such decomposition processes result in four categories of malodorous products: (1) inorganic gases including hydrogen sulfide and ammonia; (2) organic acids such as acetic, lactic, propionic and burytic; (3) toxics such as indole, skatole, phenols and the mercaptans; and (4) amines including cadaverine and putrescine. Often the foul odors from these products become so intense that the pond bottoms, where these compounds are mainly produced, must be removed by dredging.

Oxidation ponds are sometimes equipped with an aeration system to increase the dissolved oxygen content of the waste water in the pond. The aeration equipment employed is typically compressed air passed through perforated tubing on the pond bottom (e.g. bubble diffusers), pumps which spray waste water into the air or mechanical, paddle-type aerators which agitate the surface of the pond. Aeration not only counteracts the onset of anaerobiosis and the accompanying malodors, but also reduces the pond's areal requirement due to decreased dependence on oxygen transfer from ambient air.

Despite the advantages of aerating an oxidation pond, this practice has a significant disadvantage. Conventional aeration techniques typically increase the surface contact between waste water and ambient air or, as in the case of bubble diffusers, air which eventually is vented to the atmosphere. This increased surface contact is conducive to increased volatilization and transfer of dissolved VOC's and other volatile contaminants from the waste water to ambient air. As a result, mechanical aeration may exacerbate the odor problem.

Among the several objects of the present invention, therefore, may be noted the provision of a process and an apparatus for the treatment of oxidation ponds, oxidation ditches, and other bodies of water contained at water treatment facilities; the provision of such a process in which the waste water is aerated; and the provision of such a process in which volatile contaminants are removed from the waste water and odors caused by volatilization of dissolved contaminants in the waste water to ambient air are abated.

Briefly described, the process of the present invention comprises withdrawing a water stream containing dissolved volatile contaminants from a body of waste water. The withdrawn stream is contacted with an air stream in an air-water contact apparatus to produce an aerated water stream and an off-gas stream. Volatile contaminants are transferred from the water to the off-gas stream and at least a portion of the aerated water stream is returned to the body of waste water. The off-gas stream is passed through a fixed bed type biofilter comprising a porous filter bed containing appropriate microorganisms. Volatile contaminants in the off-gas stream thereby come into contact with the microorganisms and are biologically metabolized into environmentally innocuous substances such as carbon dioxide and water or sulfates.

Other objects and features will be in part apparent and in part pointed out hereinafter.

DETAILED DESCRIPTION OF THE INVENTION

Figure 1:
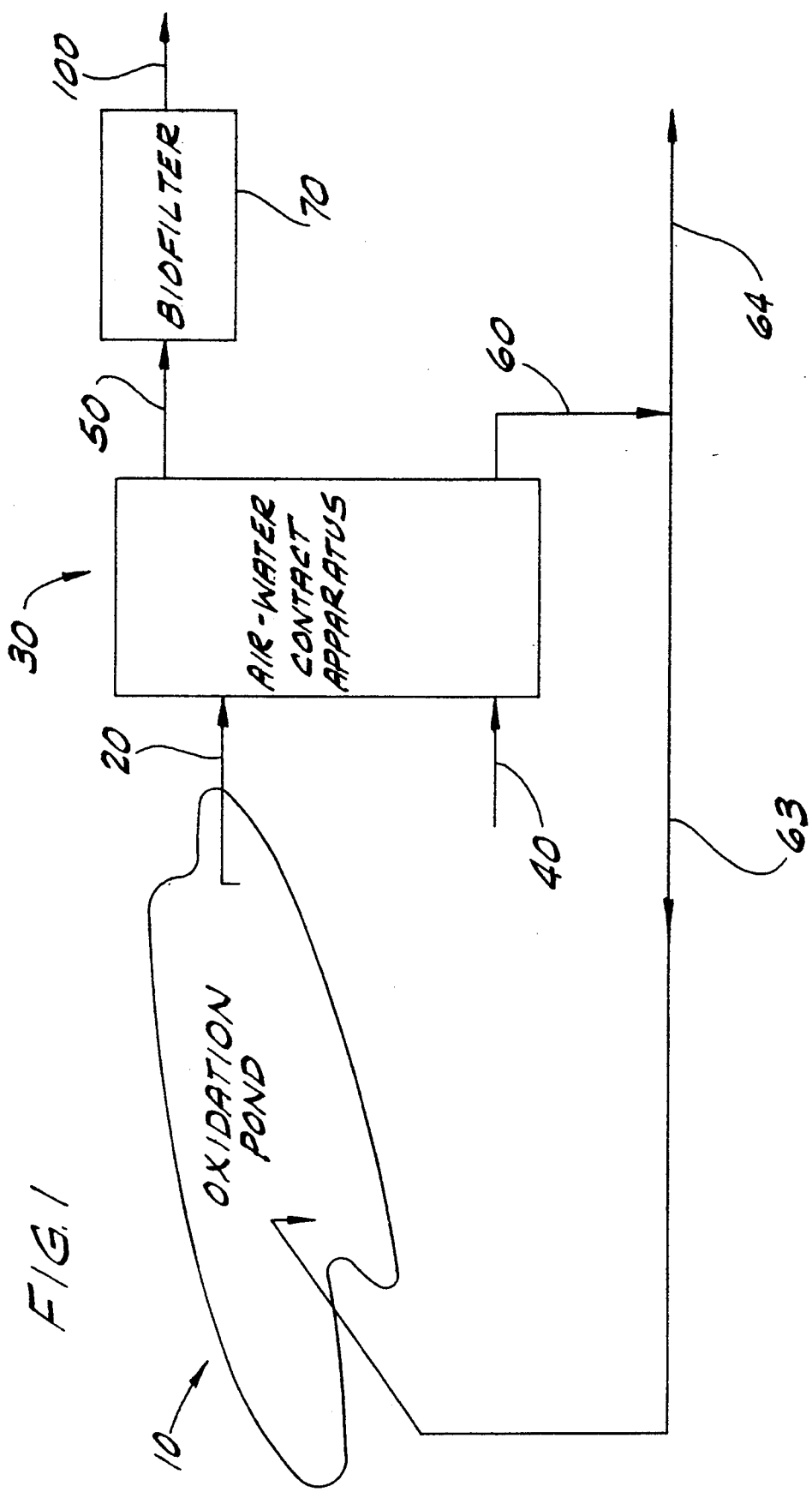
FIG. 1 is a block diagram of the process according to the present invention.

The process of the present invention is illustrated by the block diagram shown in FIG. 1. A stream of waste water 20 containing dissolved volatile contaminants is withdrawn from oxidation pond 10 and directed to air-water contact apparatus 30. In apparatus 30, water stream 20 is intimately contacted with ambient air stream 40 to affect transfer (i.e., stripping) of dissolved volatile contaminants from water stream 20 to air stream 40 and to produce off-gas stream 50 containing the stripped contaminants and aerated water stream 60 which has a reduced concentration of the volatile contaminants.

Off-gas stream 50 is directed to biofilter 70 which converts the stripped contaminants into environmentally innocuous compounds. After biofiltration, cleaned, non-odorous, off-gas 100 is vented to the atmosphere.

At least a portion and preferably all of aerated water stream 60 is returned to the oxidation pond 10 in a return stream 63. Taking into account the oxygen demand of the body of waste water and the rate at which oxygen is supplied by other means such as algae and wind mixing, the rate of return of aerated water stream 60 should be sufficient to minimize the production of foul smelling putrefaction products resulting from anaerobic decomposition of contaminants in the waste water. If aerated stream 60 is not returned to oxidation pond 10 in its entirety, the balance, designated by reference numeral 64, may be discharged or, if necessary, subjected to further treatment.

The combination of air-water contact apparatus 30 and gas biofilter 70 constitutes a significant improvement over conventional oxidation pond aeration techniques. Rather than aerating oxidation pond waste water at the expense of exacerbating odor problems, the process of the present invention promotes aerobic biodegradation of the contaminants dissolved in the waste water while abating the odors caused by volatization of dissolved contaminants to ambient air surrounding the oxidation pond 10.

Air-water contact apparatus 30 may be any device capable of providing a high degree of contact between the waste water stream 20 withdrawn from the oxidation pond 10 and ambient air stream 40. Suitable apparatus include packed towers such as those available from Ceilcote Air Pollution Control, Berea, Ohio, scrubbers such as those sold under the DynaWave trademark by Monsanto Enviro-Chem, Saint Louis, Mo. and sparge tanks.

Figure 2:
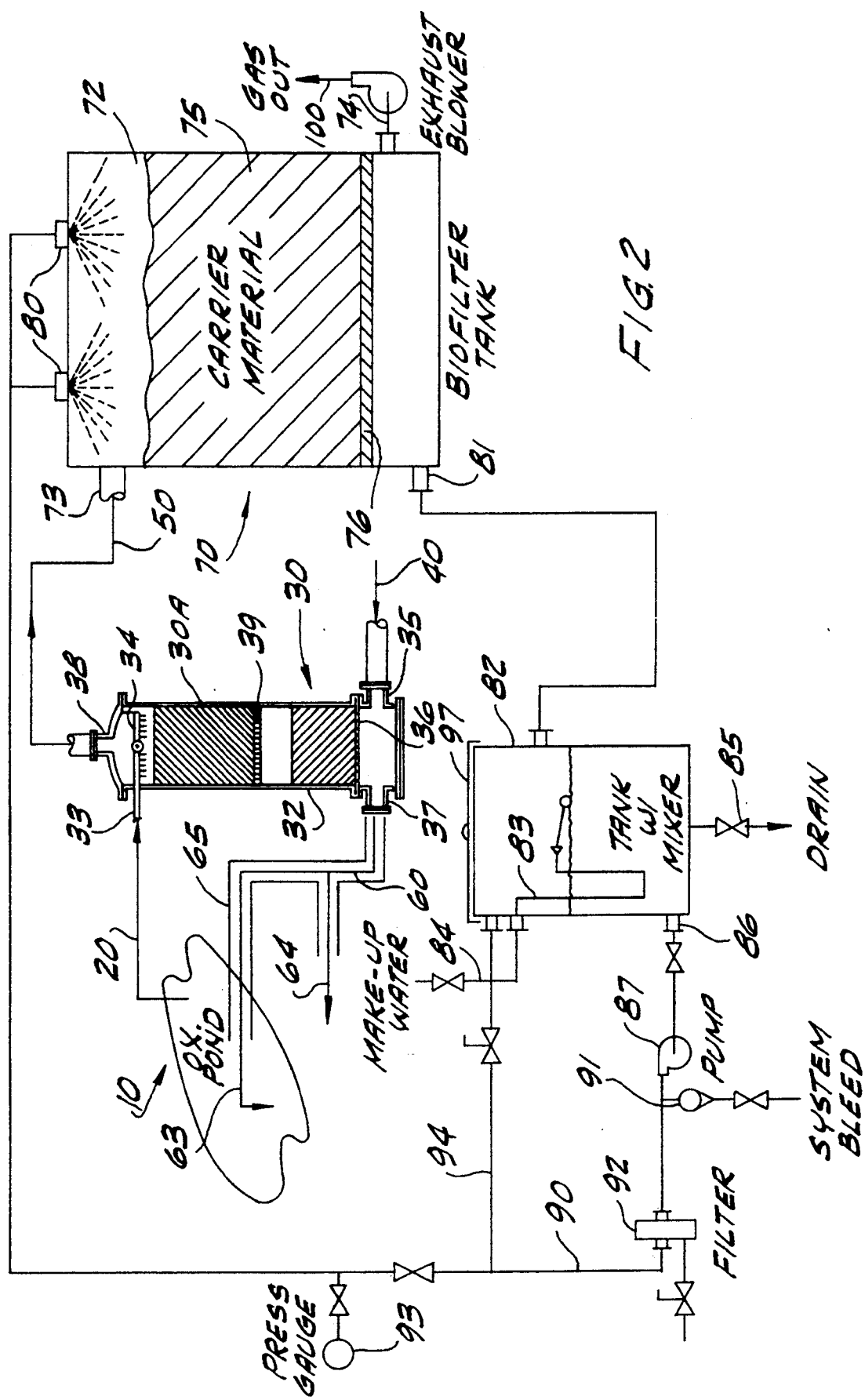
FIG. 2 is a schematic illustration of an apparatus embodying the process of the present invention.

With reference now to FIG. 2, a schematic illustration of an apparatus embodying the process of the present invention is shown. Components common to both FIGS. 1 and 2 are designated by the same reference numeral.

Packed tower 30A comprises cylindrical housing 32 having liquid inlet 33 and liquid distributor 34 at the top, gas inlet 35 and gas distributor 36 at the bottom and liquid outlet 37 and gas outlet 38 at the bottom and top respectively. The interior of housing 32 is filled with one or more sections of inert solid shapes called packing or filling. If packed tower 30A comprises more than one section of packing, then adjacent sections are separated by liquid redistributor 39.

The principal requirements of the packing are: (1) it should be chemically inert to the waste water; (2) it should be strong without excessive weight; (3) it should contain adequate passages for both the water stream 20 and the air stream 40 without excessive liquid holdup or pressure drop; (4) it should provide good contact between the waste water and the air; and (5) it should be reasonable in cost. Many types of packing are commonly used and may be either dumped randomly or stacked by hand in housing 32. Popular packing shapes include Berl saddles, Intalox saddles, Raschig rings, Pall rings and Tellerettes among others. These packings are typically made of clay, graphite, plastic or porcelain.

Waste water stream 20 enters liquid inlet 33 at the top of housing 32 and is distributed over the top of the packing by liquid distributor 34. Once the waste water is distributed over the top of the packing, the water flows uniformly in thin films over all the packing through the entire length of the tower. Liquid redistributors 39 which separate sections of packing in multi-section packed towers help maintain uniform flow over all of the packing and prevent channeling, especially in relatively tall packed towers when the flow rate of the waste water stream 20 is low.

Ambient air stream 40 enters gas inlet 35 at the bottom of the housing 32 where it is distributed by the gas distributor 36 and flows upward through the voids in the packing, countercurrent to the flow of waste water. The thin films of waste water on the packing provide a large area of contact between the contaminant laden water and the ambient air. Through this intimate contact, some of the odor causing volatile contaminants are transferred to the ambient air producing off-gas stream 50 which contains the volatile contaminants and which exits housing 32 through gas outlet 38. In addition, oxygen in the ambient air is transferred to the water, thereby producing an aerated water stream 60 at least partially, preferably substantially stripped of volatile contaminants. Aerated water stream 60 exits housing 32 through liquid outlet 37. The mass transfer relationships and design equations applicable to the design of packed towers are well understood by those skilled in the art and may be used to determine the packing height, air-to-water volumetric ratio, etc. necessary to achieve a desired concentration of a particular contaminant in the aerated water stream 60.

At least a portion of aerated water stream 60 is returned to oxidation pond 10 in return stream 63 via return conduit 65. Preferably, the return rate is sufficient to maintain the concentration of dissolved oxygen in oxidation pond 10 between about 2 and 7 mg/L.

After exiting packed tower 30A, off-gas stream 50 is delivered to fixed bed type biofilter 70. Volatile contaminants in off-gas 50 serve as a carbon/energy source for a microbial population contained in biofilter 70 which metabolically converts the contaminants to innocuous oxidation products such as carbon dioxide and water to produce the cleaned off-gas stream 100 discharged from biofilter 70.

Biofilter 70 comprises cylindrical housing 72 having gas inlet 73 and gas outlet 74. A quantity of particulate carrier material is contained within housing 72 to form porous filter bed 75. Filter bed 75 is supported by gas permeable plate 76 which has openings or channels (not shown) through which fluids may pass. Contaminant laden off-gas stream 50 enters biofilter 70 through the gas inlet 73 and enters porous filter bed 75.

The carrier material serves as a support for a biofilm which coats the surfaces of the carrier material. The biofilm is a thin layer of water containing a microbial population along with nutrients required for microbial activity. As off-gas stream 50 passes through filter bed 75, the contaminants are transferred to the biofilm where they serve as substrate for the microorganisms which metabolically convert the contaminants to innocuous oxidation products.

The quantity of carrier material employed and thus the depth of the filter bed 75 is dependent upon several factors including the specific loading rate of off-gas stream 50, the type and level of contamination in the off-gas stream 50 as well as the desired concentration of contaminants in cleaned off-gas 100.

To insure that the microorganisms in the biofilm are capable of metabolizing the stripped volatiles, the microorganisms are preferably isolated from the activated sludge of oxidation pond 10. Alternatively, the biofilm may be provided with one or more specific bacterial cultures selected to metabolize a particular contaminant otherwise recalcitrant to biodegradation.

Preferably, the carrier material is comprised of coke particles. Coke is a coherent, infusible, primarily carbonaceous solid formed by carbonizing coal, petroleum or other carbonaceous material through destructive distillation. Aside from carbon, coke ordinarily contains ash, sulfur and minerals as well as residual volatile materials. Coke is a highly porous substance having an extensive network of pores, typically having an average pore diameter of 100 nanometers or greater. As a result of this pore network, coke possesses a large specific surface area, typically as high as 500 m$^2$/g or greater.

The coke used as carrier material preferably has a particle size which is greater than about 4 mm and less than about 76.1 mm, and more preferably greater than about 12.7 mm and less than about 38.1 mm. For contaminants which are readily adsorbed, it is presently believed the coke particles may preferably be even larger than 38.1 mm. To avoid undue pressure drops across the biofilter 70, it is preferred that the carrier material comprise no more than about 2% by volume coke having a particle size less than about 4 mm and to avoid large void areas between adjacent coke particles, it is preferred that the carrier material comprise no more than about 1% by volume coke having a particle size greater than about 76.1 mm.

The carrier material may consist entirely of coke particles or comprise a mixture of coke and other conventional carrier materials described herein, including biomass materials such as compost, peat or spagnum peat, pH controls such as marl, adsorbents such as activated carbon, and various sources of nutrients including potassium, phosphorous or nitrogen. The addition of biomass may desirably increase the hydrophilic property of the carrier material or satisfy alternative or additional substrate requirements of the microorganism colony. The carrier material thus may comprise coke, mixtures of coke and biomass materials or layers of coke, biomass materials and mixtures of coke and biomass materials. Preferably, the carrier material contains at least about 50% coke, and more preferably at least about 70% coke on a volume basis.

The stability of filter bed 75 may be enhanced by placing a quantity of coke particles in housing 72, distributing the biomass or other material on top of the coke particle matrix and manually working the biomass or other material into the void spaces of the matrix, preferably without substantially disturbing the coke particle matrix, and repeating this process until the desired quantity of carrier material is deposited in biofilter 70. If prepared in this manner, filter bed 75 comprises a substantially non-compressible matrix of coke; substantially all of the coke particles are in contact with and supported by at least one adjacent coke particle. Biomass and other materials incorporated into the carrier material in this manner have a particle size which is typically smaller than the average void spacing between adjacent coke particles in the matrix. Furthermore, the volumetric proportion of coke particles in the carrier material is sufficiently high so that the total void space in the matrix can accommodate the volume of biomass or other material.

Biofilters containing coke as a carrier material have superior stability resulting from coke particles being in contact with and supported by adjacent coke particles as opposed to being surrounded and supported by biomass. Thus, the matrix tends to remain intact as the biofiltration process proceeds which prevents substantial increase of the pressure drop across biofilter 70 due to settling and compaction of filter bed 75.

Sudden increases in contaminant level may overload removal capacity of biofilter 70. Activated carbon and similar adsorbing materials, if added to filter bed 75, adsorb and store contaminants during peak loads. Following such peak loads, microorganisms metabolize the contaminants adsorbed by the carbon.

As with biodegration of waterborne contaminants in oxidation pond 10, optimal metabolic conversion of contaminants in biofilter 70 is dependent upon maintenance of favorable conditions necessary for the growth and maintenance of the microbial population. Preferably, the temperature in filter bed 75 is maintained between 10° and 40° C. At lower temperatures microbial activity diminishes so that the desired conversion may not be obtained, while higher temperatures may kill some microbial strains. In mild climates this preferred range of temperatures generally coincides with ambient temperatures so that no special temperature control measures are necessary. However, if required, the temperature in filter bed 75 may be controlled by air dilution as well as heating or cooling off-gas stream 50.

Moisture or humidity control in filter bed 75 is critical to the maintenance of contaminant conversion efficiencies. Too little moisture depletes the biofilm causing dry zones within filter bed 75 in which the microorganisms cannot survive and resulting in a loss of microbial activity and a reduction in conversion. Conversely, too much water results in anaerobic zones within filter bed 75 which produces foul smelling putrefaction products that reduce the quality of air discharged from biofilter 70.

Preferably, filter bed 75 contains about 35 to 70% by weight water, and more preferably, 50 to 65% by weight water. The need for special measures to maintain the water content of filter bed 75 is reduced in the present invention because off-gas stream 50 exiting the air-water contact apparatus 30 is saturated or nearly saturated with water. As a result, the water content of off-gas stream 50 will typically be sufficient to maintain the water content of filter bed 75 within the desired range as off-gas stream 50 flows through filter bed 75. However, to ensure the water content of filter bed 75 is adequately maintained, filter bed 75 may be periodically or continuously sprayed with water from nozzles 80 located above the carrier material. Excess water flows through the filter bed 75, out of cylindrical housing 72 through water outlet 81 and into mix tank 82. Mix tank 82 has level control 83, a source of fresh make-up water 84, drain 85 and outlet 86. Pump 87 recirculates water from mix tank 82 to nozzles 80 via conduit 90. Conduit 90 has liquid bleeding means 91, filter 92, pressure gauge 93 and return line 94. Mix tank 82 additionally has removable lid 97 through which nutrients for the microorganisms such as potassium, nitrogen and/or phosphorous containing compounds and the like can be dissolved into the water.

The pH of the water within the filter bed 75 is preferably maintained between 6 and 8. Acidification of the filter bed 75 sometimes occurs when the microorganisms metabolize sulfur containing contaminants such as mercaptans or hydrogen sulfide, nitrogen containing contaminants such as amines or ammonia and halogenated VOC's such as carbon tetrachloride. The presence of these types of contaminants in off-gas stream 50 may result in a decrease in the pH of the water within filter bed 75 below 6 which may inhibit microbial activity. To remedy this problem, limestone, marl or other alkaline substances may be mixed with the carrier material or introduced as a solute in the spray water to counteract acidification.

This invention is illustrated by the following example which is merely for the purpose of illustration and is not to be regarded as limiting the scope of the invention or manner in which it may be practiced.

EXAMPLE

The process of the present invention was used to treat an oxidation pond having a surface area of approximately 6 acres and an average depth of about 5 feet and containing waste water from a diary farm. The water retained in the pond contained waste from dairy barns, including manure and stall sorbents such as hay regularly flushed from the diary barns. Analysis of air samples taken from above the pond indicated the presence of ammonia, hydrogen sulfide, butyric acid, propionic acid and methane. Prior to initiating the process of the present invention, the dissolved oxygen concentration in the oxidation pond waste water was approximately 0.7 mg/L.

Water (4 GPM) from the pond was withdrawn and directed to a small packed tower constructed from an eight foot section of schedule 40 PVC pipe having a six inch diameter. The packing height was limited to about 6 feet to facilitate handling and operation. Pall rings 2 inches in diameter were used as a random packing. A stream of ambient air (25 ACFM) was drawn into the base of the packed tower by a forward curved, low pressure drop blower and passed upward through the packing countercurrent to the down-flowing waste water. The dissolved oxygen content of the waste water delivered to the packed tower was approximately 0.7 mg/L while the oxygen content of the aerated water stream exiting the packed tower was approximately 4.1 mg/L. All of the aerated water stream exiting the packed tower was recycled to the oxidation pond.

Off-gas from the packed tower was delivered to a biofilter having an initial filter bed volume of approximately 25 cubic feet. The carrier material used consisted of 50% peat moss, 35% straw, 10% rotted cow manure and 5% spagnum peat on a volume basis. Spray nozzles located above the carrier material were used to maintain the water content of the filter bed. During start-up, the filter bed was provided with appropriate microorganisms by spraying dairy waste water onto the carrier material. Every eight hours during the course of this trial, spray water that collected in a sump below the filter bed was circulated to the spray nozzles and sprayed on the carrier material for 3 minutes. Once each day fresh water was sprayed through the nozzles onto the carrier material for a period of 1 minute. The bed was inspected periodically and always found to be wet.

The concentration of ammonia and hydrogen sulfide in the water streams entering and exiting the packed tower were monitored to determine the extent of stripping in the packed tower. These concentrations and the stripping efficiencies are set forth in Table I below:

TABLE I

| Contaminant | Stripper Water Inlet Concentration (mg/L) | Stripper Water Outlet Concentration (mg/L) | Efficiency |
| --- | --- | --- | --- |
| Ammonia | 620 | 580 | 6.5% |
| Hydrogen Sulfide | .615 | .595 | 3.25% |

The ammonia and hydrogen sulfide stripping efficiencies were low. However, no attempt was made to demonstrate optimal stripping in the present example. It is expected that stripping efficiencies could be significantly improved through design of the packed tower.

After start up, the concentrations of ammonia, hydrogen sulfide and the total organic carbon (TOC) in the off-gas stream and the clean air exiting the biofilter were analyzed using gas impingers and standard wet chemistry analysis. Total organic carbon analyses were conducted using a Foxboro OVA analyzer. The results are tabulated in Table II below:

TABLE II

| Contaminant | Stripper Off-gas Concentration (mg/L) | Biofilter Air Outlet (mg/L) | Conversion Efficiencies (%) |
| --- | --- | --- | --- |
| Ammonia | $9.1 \times 10^{-3}$ | $4.2 \times 10^{-4}$ | 95.4 |
| Hydrogen Sulfide | $1.5 \times 10^{-2}$ | $1.3 \times 10^{-5}$ | 99.9 |
| Total Organic Carbon | 210 ppm | 100 ppm | 53.3 |

While certain representative embodiments and details have been shown for the purpose of describing the invention, it will be apparent to those skilled in the art that various changes and modifications may be made therein without departing from the scope of the invention.

What is claimed is:

1. A process for treating a body of waste water, said waste water containing volatile contaminants and a microbial population for the biodegradation of said contaminants, the process comprising:
   withdrawing a water stream from the body of waste water;
   contacting the water stream with an air stream in an air—water contact apparatus to produce an aerated water stream and an off-gas stream;
   returning at least a portion of the aerated water stream to the body of waste water to promote aerobic biodegradation of said volatile contaminants by the microbial population in the body of waste water; and
   passing the off-gas stream through a fixed bed type biofilter comprising a porous filter bed containing microorganisms in a biofilm supported by a carrier material.

2. The process of claim 1 wherein all of the aerated water stream is returned to the body of waste water.

3. The process of claim 1 wherein the air—water contact apparatus is a packed tower.

4. The process of claim 1 wherein the carrier material comprises coke having a particle size which is greater than about 4 mm and less than about 76.1 mm.

5. The process of claim 4 wherein the carrier material comprises coke in a proportion of at least 70% on the basis of volume.

6. The process of claim 4 wherein the carrier material comprises coke in a proportion of at least 70% on the basis of volume and the carrier material additionally comprises compost, peat or other biomass material.

7. The process of claim 4 wherein the carrier material comprises coke having particle size which is greater than abaout 12.7 mm and less than about 38.1 mm.

8. The process of claim 7 wherein the carrier material comprises coke in a proportion of at least 70% on the basis of volume and the carrier material additionally comprises compost, peat or other biomass material.

* * * * *